(12) United States Patent
Berdermann et al.

(10) Patent No.: US 7,274,025 B2
(45) Date of Patent: Sep. 25, 2007

(54) DETECTOR FOR DETECTING PARTICLE BEAMS AND METHOD FOR THE PRODUCTION THEREOF

(75) Inventors: Elèni Berdermann, Munich (DE); Wim De Boer, Karlsruhe (DE)

(73) Assignee: Gesellschaft fuer Schwerionenforschung mbH, Darmstadt (DE)

( * ) Notice: Subject to any disclaimer, the term of this patent is extended or adjusted under 35 U.S.C. 154(b) by 204 days.

(21) Appl. No.: 10/502,245

(22) PCT Filed: Jan. 23, 2003

(86) PCT No.: PCT/EP03/00705

§ 371 (c)(1), (2), (4) Date: Dec. 29, 2004

(87) PCT Pub. No.: WO03/062854

PCT Pub. Date: Jul. 31, 2003

(65) Prior Publication Data

US 2005/0116174 A1   Jun. 2, 2005

(30) Foreign Application Priority Data

Jan. 25, 2002 (DE) ............................. 102 03 101
Mar. 19, 2002 (DE) ............................. 102 12 223

(51) Int. Cl.
*G01T 1/24* (2006.01)
*H01L 29/15* (2006.01)

(52) U.S. Cl. .................................. 250/370.01; 257/77

(58) Field of Classification Search ........... 250/370.01, 250/370.05, 390.01, 338.4, 484.3, 336.1; 257/77, 536, 537
See application file for complete search history.

(56) References Cited

U.S. PATENT DOCUMENTS 3,665,193 A    5/1972   Kozlov et al.

(Continued)

OTHER PUBLICATIONS

Han S K et al.: "Fabrication and testing of a microstrip particle detector based on highly oriented diamond films" Diamond and Related Materials, Elsevier Science Publishers, Amsterdam, NL, vol. 9, No. 3-6, Apr. 2000, pp. 1008-1012.

(Continued)

*Primary Examiner*—David Porta
*Assistant Examiner*—Faye Boosalis
(74) *Attorney, Agent, or Firm*—Frommer Lawrence & Haug LLP; Ronald R. Santucci

(57) ABSTRACT

The invention relates to a detector, and to a method for the production thereof, for detecting a high-energy and high-intensity particle beam (2), which comprises a crystalline semi-conductor plate (3) having a metal coating (4) and which is arranged on a substrate (5), the semi-conductor plate (3) being a diamond plate (6), which is coated on both faces with metal structures (7, 8). The metal structures (7, 8) comprise aluminium and/or an aluminium alloy and form electrodes, which are arranged to be connected to various electrical potentials by way of conductor tracks (10) on the substrate (5), the substrate (5) being a ceramic plate (11) having a central orifice (24), which is covered by the diamond plate (6).

27 Claims, 9 Drawing Sheets

U.S. PATENT DOCUMENTS

| | | | |
|---|---|---|---|
| 5,173,612 A * | 12/1992 | Imai et al. | 250/505.1 |
| 5,216,249 A * | 6/1993 | Jones et al. | 250/370.05 |
| 5,298,749 A * | 3/1994 | Inushima | 250/338.4 |
| 5,471,947 A * | 12/1995 | Southworth et al. | 117/94 |
| 5,562,769 A * | 10/1996 | Dreifus et al. | 117/86 |
| 5,717,214 A * | 2/1998 | Kitamura et al. | 250/370.1 |
| 5,773,830 A | 6/1998 | Lu et al. | |
| 6,453,748 B1 * | 9/2002 | Pryor | 73/727 |
| 6,582,513 B1 * | 6/2003 | Linares et al. | 117/93 |

OTHER PUBLICATIONS

Souw E-K et al.: "Response of CVD diamond detectors to alpha radiation" Nuclear Instruments & Methods in Physics Spectrometers, Detectors and Associated Equipment, North-Holland Publishing Company, Amsterdam, NL, vol. 400, No. 1, Nov. 21, 1997, pp. 69-86.

Wang S G et al.: "Investigation on polycrystalline CVD diamond-based alpha-particle detectors" Materials Research Bulletin, Elsevier Science Publishing, New York, US, vol. 37, No. 6, May 2002, pp. 1033-1040.

Krammer M et al.: "CVD diamond sensors for charged particle detection" Diamond and Related Materials, Elsevier Science Publishers, Amsterdam, NL, vol. 10, No. 9-10, Sep. 2001, pp. 1778-1782.

Bauer C et al.: "Recent results on chemical-vapor-deposited diamond microstrip detectors" Nuclear Instruments & Methods in Physics Research, Section—A: Accelerators, Spectrometers, Detectors and Associated Equipment, North-Holland Publishing Company, Amsterdam, NL, vol. 380, No. 1-2, Oct. 1, 1996, pp. 183-185.

* cited by examiner

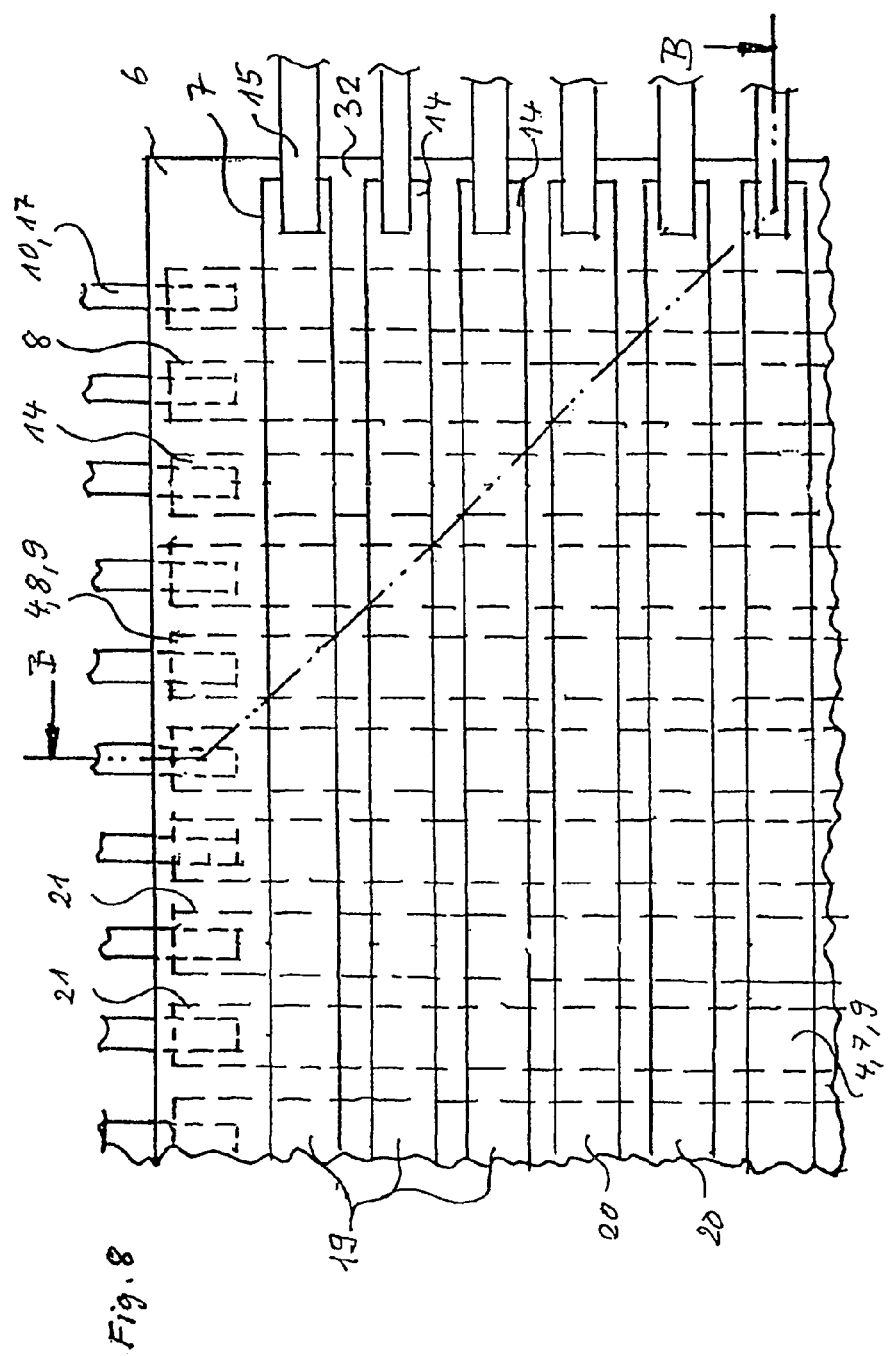
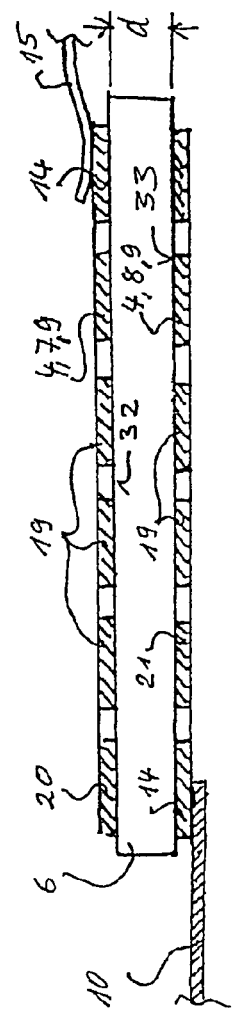
Fig. 8
Fig. 9

DETECTOR FOR DETECTING PARTICLE BEAMS AND METHOD FOR THE PRODUCTION THEREOF

This application is a 371 of PCT/EP03/00705 filed on Jan. 23, 2003, published on Jul. 31, 2003 under publication number WO 03/062854 and which claims priority benefits from German patent application number DE 102 03 101.0 filed Jan. 25, 2002 and German patent application number DE 102 12 223.7 filed Mar. 19, 2002.

The invention relates to a detector for detecting particle beams, especially high-intensity and high-energy particle beams, which comprises a crystalline semi-conductor plate having a metal coating and which is arranged on a substrate, and also to a method for the production thereof, in accordance with the preambles of the independent claims. In this context, high-intensity particle beams are understood to be particle beams comprising pulse packets having more than $10^5$ particles per pulse packet and mm$^2$, preferably more than $10^7$ particles per pulse packet and mm$^2$, up to $10^{13}$ particles per pulse packet and mm$^2$.

Various detector types, as are described by P. Strehl in the Handbook of Ion Sources, CRC-Press, 1995, pages 385 ff., are known for detecting particle beams. In one of the detector types, which is described by Roger Fourme in the Journal Nuclear Instruments Methods A 392, pages 1 to 11, 1997, a wire is used, which is surrounded by a detector gas so that a signal can be derived from the wire when particles pass through the detector gas or counting gas. By setting out grids of wires it is also possible to measure positional distribution of the particle beam. However, the resolution is limited by the diameter of the wire in the region of 25 µm and by the requisite wire-to-wire spacing. In addition, when the irradiation is of high intensity, the counting gas fails, as a result of plasma formation.

Another detector type comprises a semi-conductor plate, especially a monocrystalline silicon plate, which is coated with gold on both faces. However, such a detector has the disadvantage that, in the case of high-intensity irradiation with particle beams, the silicon plate undergoes radiation damage in its diamond-type silicon lattice, which results in the formation of faulty locations and reduces the charge collection efficiency of the detector of silicon to an extreme degree and increases the fault current.

Attempts at using polycrystalline diamond plates, instead of the silicon plate, for the measurement of high-intensity particle beams have not been successful despite a complex structure of metallisation of the diamond plates comprising firstly a titanium coating or titanium/tungsten coating or a chromium coating, which adheres well to diamond, and subsequently a gold contact coating.

It has hitherto been possible to measure high-intensity particle beams only using relatively insensitive beam transformers, which surround the particle beam with induction windings and detect it.

The problem of the invention is to provide a detector, for detecting a high-intensity particle beam, which is more sensitive than beam transformers and which overcomes the disadvantages of the prior art and which can detect high-intensity and high-energy particle beams without being intensively cooled. The problem of the invention is also to describe a method for the production of a detector of such a kind.

The problem is solved by the subject-matter of the independent claims. Advantageous developments of the invention are to be found in the dependent claims.

In accordance with the invention, the detector comprises, as semi-conductor plate, a diamond plate coated on both faces with metal structures, the metal structures comprising aluminium and/or an aluminium alloy. The metal structures form electrodes, which are arranged to be connected to various electrical potentials by way of conductor tracks on the substrate. The substrate comprises a ceramic plate having a central orifice, which is covered by the diamond plate. In the simplest case, the metal structures on both faces can be a full coating on both faces of the diamond plate, with only a peripheral zone around the metallisation remaining uncovered on both faces.

This detector has the advantage that it can measure the intensity of a high-intensity particle beam, especially an ion beam, without being intensively cooled. In addition, the electrodes on the diamond plate can be so structured that the intensity distribution can be measured over the cross-section of the high-energy particle beam with high resolution. Using the detector, it is, moreover, possible for the intensity distribution to be measured over time, resulting in the following substantial advantages of this detector comprising a diamond plate having aluminium metal structures:

1) an unexpectedly high radiation resistance of the detector structure up to maximum intensities of up to $10^{13}$ particles per pulse packet and per mm$^2$, in orders of magnitude of up to 100 tera eV of energy deposited in the detector, at pulse widths of 100 ns to 10 s;
2) high time resolution of a particle beam pulse or pulse packet, having a time resolution in the sub-nanosecond range,
3) high resolution of the spatial distribution of the beam in the sub-millimetre range;
4) beam intensity detection which is linear over more than 10 orders of magnitude so that, even at the highest order of magnitude of about $10^{13}$ particles per pulse packet and mm$^2$, no intensive cooling is necessary and even merely 1 particle/mm$^2$ can be detected using the detector according to the invention;
5) a measurement signal magnitude which is more than three powers of ten higher than measurement signals of conventional beam transformers.

Those unexpected advantages are possibly based on the nature of the diamond material and the nature of the metallisation, the atomic number Z of the aluminium being situated close to the atomic number Z of the carbon and consequently the ionisation loss in the aluminium is very well matched to the ionisation loss in the diamond. The diamond plate aluminised on both faces brings about the signal generation by means of appropriate electron-hole pair formation within its volume, forming a current flow which can be measured in the crystal at the electrodes under high voltages—at electric field strengths between the electrodes in the range from 0.5 V/micrometre to 5 V/micrometre. In the process there is found to be, as a further advantage, an unexpected proportionality between the intensity of the high-energy particle beam and the signal current at the electrodes of the detector.

A detector of high-purity diamond has the advantage that, in the case of high-intensity and high-energy particle beams, especially in the case of high-intensity ion beams, there is a large amount of electron-hole pair formation and that the electrodes, held at high potentials, can deliver an appropriately high signal current by means of which an oscillograph can be driven directly and consequently the intensity of the ion beam can be measured without intermediate amplification.

Because the detector of high-purity diamond exhibits an extremely low degree of noise, it is also possible for a single particle to be detected by means of a suitable amplifier so that the overall intensity range can be measured from the single particle per mm$^2$ up to $10^{13}$ particles per pulse packet and per mm$^2$. Such a wide measurement range which extends over more than 10 orders of magnitude cannot be achieved with conventional detectors. For the lower intensity ranges of up to $10^5$ particles per pulse packet it is certainly possible to use diamond detectors having conventional complex metallisation. For intensity ranges of more than $10^5$ up to $10^{13}$ particles per pulse packet it has not been possible, even using diamond plate detectors or, alternatively, other conventional detectors, for such pulse packets to be measured reproducibly and lastingly with appropriately high resolution. It is only with the structure of the detector according to the invention that the intensity measurement problem for high-intensity particle beams, especially for a range between $10^7$ up to $10^{13}$ particles per pulse packet, has been surprisingly and unexpectedly solved.

In a further preferred embodiment of the invention, the metal structures on the upper face and lower face of the diamond plate form two continuous metal layers. Such continuous metal layers on the lower face and upper face, together with an appropriately thin aluminium support, have the advantage that a detector structured in such a manner can detect the total number of particles passing through or the intensity of the high-energy particle beam. For the purpose, the metal layer on the lower face is held at a ground potential and the metal layer on the upper face is held at a potential which produces a field strength in the diamond plate in the range from 0.5 V/μm to 5 V/μm. This means that, when the diamond plate has an average thickness of 50 μm, a voltage of from 25 to 250 V is used, with correspondingly higher voltages being used in the case of correspondingly thicker diamond plates.

In order to avoid the field lines emerging from the peripheral region of the detector and to avoid the resulting electrical breakdowns or creepage currents in the peripheral region, the peripheral regions of the metal layers on the lower face and upper face of the detector have non-metallised peripheral zones. Those non-metallised peripheral zones have a width that corresponds to at least the thickness of the diamond plate. By means of that metal structure, the resistance to creepage of the detector is increased in advantageous manner.

When it is intended to measure the intensity distribution of the high-energy particles over the cross-section of a beam, two different metal structure arrangements can be used. In a first advantageous embodiment of the invention, a continuous metal layer is provided, for the purpose, on the lower face of the diamond plate and the structure on the upper face of the diamond plate has a multiplicity of microscopically small contact surfaces or metal strips. In this context, microscopically small is understood to mean a contact surface size or strip width which can be seen and measured under a light microscope using conventional microscopic measures. Those microscopically small contact surfaces or metal strips, which are arranged on the upper face of the detector opposite the metal layer on the lower face of the detector, can be electrically connected by way of bonding wires to interwiring lines on the ceramic plate which are in turn connected to evaluation circuits and/or to external connections of the detector, or they are connected by way of conductor tracks on an insulation layer on the diamond plate and by way of interwiring lines on the ceramic plate to evaluation circuits or to external connections of the detector.

In this embodiment of the invention, the multiplicity of microscopically small contact surfaces are arranged at grid dimensions that are as close together as possible so that a high degree of resolution per unit area of down to less than 50 micrometres can be achieved.

In a further embodiment of the invention, the metal structures have a grid network of metal strips, the metal strips on the lower face of the diamond plate being arranged at a right angle to the metal strips of the upper face of the diamond plate. By means of that arrangement the diamond plate can be divided up into small volume elements in similar manner to a wire grating arrangement, each volume element having electrodes located opposite one another, which can be scanned by an appropriate electronic supply and evaluation circuit in rows and columns so that a clear picture of the intensity distribution over the cross-section of the ion beam is made possible by means of a detector structured in that manner.

The individual strips can be connected by simple means, by way of bonding wires or directly, to interwiring lines on the ceramic plate, which for its part also has contact connection surfaces which can be connected to external connections of the detector. In the case of a pitch spacing of from 20 μm to 50 μm in each strip arrangement, it is possible, on a plate of 10×10 mm, taking into account a non-metallised periphery of 1 mm, to accommodate about 160 strips at a pitch of 50 μm, resulting in 25600 crossing points between the strips on the upper face and lower face, and consequently 25600 measurement points are made possible. This allows exact measurement of the position of the ion beam and exact measurement of the profile of the ion beam.

In a further embodiment of the invention, the detector has a carrier frame, on which the components of the detector are fixed. A carrier frame of such a kind has the advantage that it provides the ceramic plate with adequate support and can at the same time protect the detector from damage. Furthermore, the carrier frame can be made from a metal and serve as a supply conductor for the ground potential. In that arrangement, an electrically conductive elastomeric buffer of conductive rubber is fitted between the carrier frame and the ceramic plate, preventing mechanical stresses on the ceramic plate, which is sensitive to tension, so that a long detector service life is achieved.

Furthermore, instead of an aluminium carrier frame, an enclosed detector housing of aluminium can accommodate the components of the detector and fix them in position. By means of a completely enclosed detector housing of aluminium, optimum shielding against electrical interferences is produced as in the case of a Faraday cage. Such a detector housing has the advantage that it provides the ceramic plate with adequate support and can at the same time protect the diamond plate from damage. It is also possible for elastomeric electrically conductive buffers to be fitted in the detector housing in order to protect the ceramic plate from mechanical stresses. The detector housing of aluminium can, moreover, be used as a supply conductor for the ground potential.

The orifice in the ceramic plate has slightly smaller external dimensions than the detector plate or diamond plate itself, which covers the orifice. In a preferred embodiment of the invention, the orifice in the ceramic plate is circular. A circular orifice of such a kind having a corresponding detector is used when the high-intensity and high-energy particle beam is expected to have a circular cross-section. If the particle beam is a scanning beam, however, a tetragonal orifice in the ceramic plate is found to be advantageous so that in a further preferred embodiment of the invention the detector and the ceramic plate orifice are of tetragonal construction.

In a further embodiment of the invention, the diamond plate is a self-supporting polycrystalline diamond plate formed by chemical gas phase deposition and having a thickness in the range from 10 μm to 500 μm, preferably in the range from 50 μm to 200 μm. Because diamond is an extremely strong and hard material, platelets or plates having a thickness of even 10 μm can certainly be produced so that they are self-supporting, so that a thickness range of from 10 to 500 μm is achievable. For application of the metallisation or metal structures, such diamond plates can be polished on both faces so that completely flat surfaces are produced, ensuring in the process that the planes of the upper face and the lower face are parallel to one another.

The polycrystallinity of the diamond plate in this embodiment limits the signal homogeneity, however, because of the grain boundaries occurring in the diamond plate. Therefore, in a further embodiment of the invention, there is used a self-supporting monocrystalline diamond plate having a thickness in the range from 50 μm to 500 μm, preferably from 50 to 200 μm. In the case of detectors having appropriately structured electrodes on each face of the diamond plate it is possible to achieve beam intensity and/or beam profile measurement as well as measurement of the beam distribution over time independently of the impact location of the particle beam. Furthermore, in the case of a diamond plate of such a kind, the afore-mentioned measurement resolution of 25600 measurement points per $cm^2$ can be advantageously achieved. For that purpose, the monocrystalline diamond plate can have a peripheral length of several centimetres, preferably from 2 to 6 cm, which corresponds to an area of about 5×5 $mm^2$ up to about 15×15 $mm^2$.

The afore-mentioned interwiring lines on the ceramic plate can, when it is not necessary to achieve an extremely fine structure in the micrometre range, consist of printed thin-film or thick-film conductors and additionally comprise passive components such as resistors, capacitors and coils in the same technology. There can accordingly be provided on the ceramic plate, in addition to the interwiring lines, a circuit which already carries out evaluation or which modifies the impedance. It is especially advantageous to provide an impedance in thin-film technology which corresponds to the internal resistance of the evaluating oscillograph. That internal resistance of the oscillograph is usually 50 Ω.

A method for the production of a detector for detecting high-energy and high-intensity particle beams, which detector comprises a crystalline semi-conductor plate having a metal coating and is arranged on a substrate, comprises the following method steps:

provision of a suitable substrate plate, preferably a monocrystalline diamond substrate plate, or a monocrystalline silicon plate or a metal plate of a metal having a melting point of more than 1000° C., chemical gas phase deposition, on the substrate plate, of a diamond layer of carbon, removal of the substrate plate from the self-supporting diamond layer to form a diamond plate, coating of the upper face and reverse face of the diamond plate with metal structures, provision of a ceramic plate having a central orifice and conductor tracks and/or metal layers having contact connection surfaces and/or passive components on its upper face and metallisation over the entire surface on its reverse face, mounting of the diamond plates, metallised on both sides, on the ceramic plate, the central orifice being covered, connection of the metal structures of the diamond plate to metal structures on the ceramic plate, fixing the detector components on a carrier frame with the aid of a holding frame.

This method has the advantage that there is firstly produced, in steps, the heart of the detector, namely a diamond plate. For the purpose it is advantageously possible, in the first step, for the diamond lattice type of, for example, a monocrystalline diamond substrate plate or a silicon carrier plate, to be continued further by arranging carbon atoms on that diamond lattice type of such substrate plates, which results in a monocrystalline diamond plate in the case of a monocrystalline diamond substrate. However, in the case of a silicon carrier plate, the diamond lattice type no longer comprises silicon atoms on deposition but rather carbon atoms. The latter lattice structure, having a different lattice constant, results in a polycrystalline diamond layer.

A further advantage of that method is that, after an appropriate layer of diamond has been produced in the case of a silicon carrier plate or metal plate, the plate can be removed, especially in view of the fact that the diamond layer will have become a self-supporting plate when it has an appropriate thickness of at least 10 μm. An advantage of the substrate plate comprising a metal having a melting point of more than 1000° C., preferably of molybdenum, has the advantage that a reaction temperature that is as high as possible is used in the diamond coating deposition method, which can accelerate carbon deposition from the gas phase. After removal, a polycrystalline diamond plate having a thickness of 10 μm to 1000 μm remains behind. The substrate plate can be polished on its upper face and on its reverse face when an adequate thickness between 100 μm and 1000 μm, preferably between 100 μm and 500 μm, has been achieved so that a completely flat surface is available for the metal structures.

Aluminium or an aluminium alloy is advantageously used as the metal of the metal structures on the diamond plate, the atomic number Z of the aluminium being situated close to the atomic number Z of the carbon and consequently the ionisation loss in the aluminium is matched to the ionisation loss in the diamond.

A further advantage of this method is the use of a ceramic plate which can, on the one hand, change microscopic partial structures on the diamond plate to macroscopic metal structures so that appropriately large external connections for the detector can be mounted on the ceramic plate. In this context, macroscopic means that the dimensions of those structures are sufficiently large to be seen and measured with the naked eye. The appropriately prepared interwiring lines or conductor tracks on the ceramic plate also serve the purpose of enlarging the access elements. Without such interwiring lines and consequently without such areas being available on the ceramic plate it would not be possible to access the microscopically small structures on the diamond plate.

The fixing of the detector components on a carrier frame can be advantageously accomplished by a metal frame likewise of aluminium. Such aluminium frames are simple to fabricate and consequently a ceramic plate can be adjusted and fixed when appropriately prepared structures such as, for example, holes are present on the carrier frame. In addition, aluminium has high thermal conductivity so that heat produced in the diamond plate can be transferred, by way of the ceramic plate, to the aluminium frame and on to the housing of a system in which the detector is being used.

In order to provide a monocrystalline silicon carrier plate, a monocrystalline silicon wafer can first be sawn off from a monocrystalline silicon column. That surface of the wafer on which the diamond plate is to be deposited is then lapped by chemo-mechanical means. In the meantime, both when producing the monocrystalline silicon column and also when cutting the monocrystalline silicon wafer, attention is given to ensuring that the crystal orientation is advantageous for the deposition of diamond. This has the advantage that the surface of the monocrystalline silicon wafer can have an orientation that is favourable for the oriented, uniformly aligned growth of crystalline diamond in the diamond lattice on the silicon wafer of a diamond lattice type.

In the chemical gas phase deposition of a diamond layer of carbon on the substrate plate, in a further embodiment of the invention, a gaseous organocarbon substance is used as reaction gas and hydrogen as carrier gas. Usually, the organocarbon substance is a methane gas, which is added in a volumetric proportion of 0.5 to 2% by vol. to the hydrogen gas, the carbon being deposited from the gaseous organocarbon substance onto the substrate plate.

After the deposition of a polycrystalline diamond layer on the substrate plate having a monocrystalline diamond lattice, the substrate plate is, in a further exemplary embodiment of the method, removed from the self-supporting diamond layer by means of a plasma etching method. Instead of a plasma etching method, wet chemical methods can also be used, wherein—when a silicon carrier plate is used as the substrate plate—there is used a mixture of hydrofluoric acid and nitric acid, which dissolves or etches away the silicon while the diamond layer remains behind as a self-supporting diamond plate.

The above etching methods have the advantage that they expose a self-supporting polycrystalline diamond plate which can then be polished by chemo-mechanical means on the upper face and reverse face when the diamond plate has an adequate thickness between 100 µm and 500 µm.

For coating of the upper face and the reverse face of the diamond plate with a metal layer, a sputtering, vapour-deposition or, alternatively, sintering method can be used. In the case of the sputtering method, a metal plate is vapourised, the vapourised atoms being deposited on the upper face and reverse face of the diamond plate and forming a metal layer.

In the case of the vapour-deposition method, an aluminium is melted in a melt crucible under a vacuum and the diamond plate is so positioned above the melt crucible that the aluminium vapour can be deposited on the diamond plate in the form of a metal layer. In a sintering method, an aluminium paste is applied to the diamond wafer and, in an appropriate sintering furnace, the binder of the aluminium paste is vapourised and, at the same time, an aluminium coating is sintered onto the diamond plate.

In any of those methods, a continuous metal layer can first be deposited on the diamond plate, which layer is subsequently structured if the detector is intended to have a position-resolving structure on its upper face.

Accordingly, for coating of the upper face and reverse face of the diamond plate with a metal structure, there is first applied a metal layer, which is subsequently structured by means of photolithography. For that purpose, a photosensitive resist is applied to the metal layer and, by means of an optical mask, the photosensitive resist layer is structured, as a result of which finally the photosensitive resist protects only those parts of the metal layer which are intended to remain behind as a contact layer or as conductor tracks on the upper face of the diamond plate while the regions left bare by the photosensitive resist are dissolved away as a result of illumination and development of the photosensitive resist in an appropriate, often alkaline, bath.

Those methods have the advantage that they are capable of producing, on the diamond plate, very finely structured conductor tracks and contact surfaces, which can be produced with microscopically small dimensions. Even greater position resolution of the detector can be achieved when a metallic strip arrangement is provided both on the upper face and on the reverse face. That strip or grid arrangement on the upper face and reverse face is incorporated in a metal layer by introducing longitudinal grooves into the metal layer by photolithographic means or by means of laser removal, it being possible to produce metal strips in the micrometre range and insulation channels or insulation grooves in the sub-micrometre range.

A diamond plate of such a kind having a metallic grid structure on the two faces requires substantially more complex evaluation and control for position resolution, in order to detect the position distribution of a high-intensity particle beam; however, at the same time, it has the advantage that the intensity distribution of an ion beam can be resolved in the micrometre range, preferably with pixels measuring $25 \times 25$ µm$^2$ to $250 \times 250$ µm$^2$.

It is, however, also possible for a structured metal layer to be applied directly, when the material is applied using a mask or template.

In order to be able to make a transition from the microscopically small structures in the form of contact surfaces and conductor tracks on the diamond plate to macroscopic structures, interwiring lines, contact connection surfaces and/or passive components are produced on the relatively large ceramic plate with macroscopic dimensions. Those can be partly in thin-film or thick-film technology, insofar as passive components and contact connection surfaces are concerned, while interwiring lines, which are intended to lead from microscopic dimensions to macroscopic components and connection elements, have to be produced with the same high resolution as the corresponding structures on the diamond plate.

For a detector which is intended to measure the overall intensity of an ion beam pulse packet, a thin metal layer having a thickness of a few millimetres is applied to the metallised diamond plate on both faces, the upper metal layer having to be provided for connection to an appropriate high voltage and the lower metal layer being connected to a frame conductor on the ceramic plate.

In a further preferred exemplary embodiment of the method, a bonding method is used for connecting the metal structure on the upper face of the diamond plate to the interwiring lines on the ceramic plate. For that purpose, appropriate bonding surfaces are provided on the ceramic plate so that, from appropriate contact surfaces on the diamond plate, bonding wires are then bonded up to the bonding surfaces on the ceramic plate.

In a further exemplary embodiment of the method, a metallic holding frame is provided for fixing the detector components on the carrier frame. That metallic holding frame can advantageously be screwed onto the carrier frame and can hold and fix the ceramic plate between the carrier frame and the holding frame, with electrically conductive elastomeric buffer elements made from conductive rubber being arranged between the ceramic plate and the carrier frame and between the ceramic plate and the holding frame. That conductive rubber ensures reliable establishment of contact and protects the tension-sensitive ceramic plate from damage during installation and operation of the detector. For that purpose, appropriate holes can be provided in the ceramic plate in order to achieve an exact alignment of the ceramic plate with respect to the conductive rubber elements, carrier plate and holding frame.

The screw connection between the holding frame and carrier frame can, at the same time, by virtue of the advantageous use of the buffer elements of conductive rubber, be used for the frame connection. Accordingly it is necessary merely to provide an appropriate interwiring line on the ceramic plate to the holding frame when the screw connection from the metallic holding frame to a metallic carrier frame likewise consists of metal screws or, when the reverse face of the ceramic plate is metallised, it is necessary merely to provide a connection to the metallisation on the lower face of the diamond plate.

The detector can be used for high-intensity, high-energy particle beams without its upper face or reverse face undergoing damage and the material being neither sputtered off, atomised nor evaporated off. Also, surprisingly, it was not possible to find any holes in the detector after it had been used many times for the measurement of high-intensity and high-energy ion beams even though such focussed particle beams, temporally compressed into pulse packets, give rise to intense mechanical shock stressing of the detector plate. Even partial crystalline restructuring of the diamond lattice in the graphite lattice regions within the diamond plate of the detector could not be observed in the event of use under such extreme loading.

The invention will be explained below in further detail by means of embodiments referring to the accompanying Figures.

FIG. 8 is a top view, in diagrammatic form, onto a region of a metal structure of the upper face of a diamond plate.

FIG. 9 is a cross-section, in diagrammatic form, through part of a diamond plate along the line of section B-B of FIG. 8.

Figure 1:
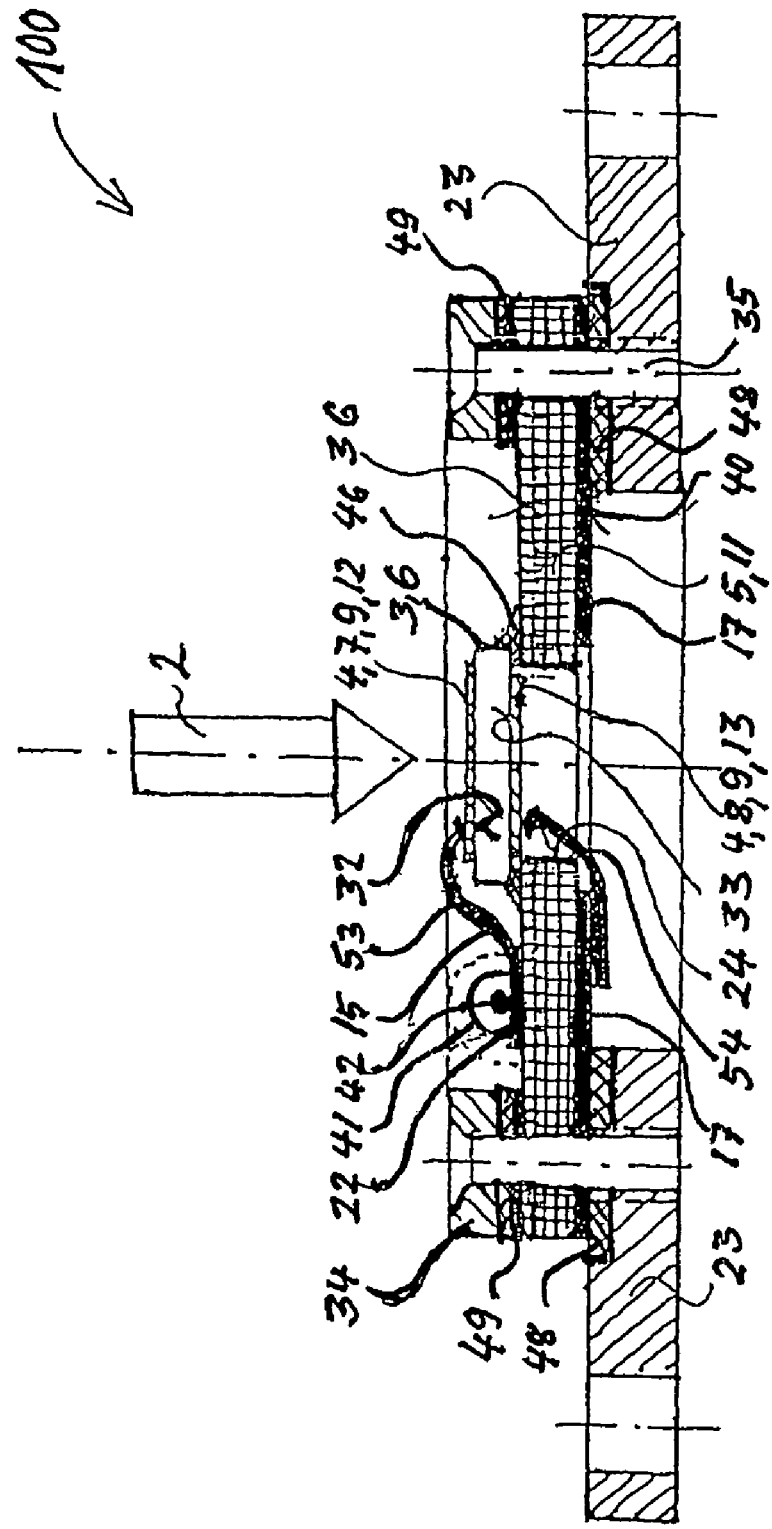
FIG. 1 is a cross-section, in diagrammatic form, through a detector according to an embodiment of the invention.

FIG. 1 is a cross-section, in diagrammatic form, through a detector 100 according to an embodiment of the invention. Reference numeral 2 denotes an arrow indicating the direction of a high-intensity and high-energy particle beam, which in this embodiment of the invention passes through the detector 100. All those surfaces of the components of the detector 100 which are located upstream relative to the ion beam direction 2 are referred to as upper faces and all those surfaces of the components of the detector which are located downstream relative to the ion beam direction 2 are referred to as reverse faces.

Reference numeral 3 denotes a semi-conductor plate. Reference numeral 4 denotes a metal coating, which is applied to two faces of the semi-conductor plate 3. Reference numeral 5 denotes a substrate, on which the semi-conductor plate 3, having its metal coating 4 on two faces, is arranged. Reference numeral 6 denotes a diamond plate, which in this embodiment of the invention is used as the semi-conductor plate 3. The material of a diamond plate 6 comprises a diamond lattice of carbon. Reference numeral 7 denotes a metal structure on the upper face 32 of the diamond plate 6 and reference numeral 8 denotes the metal structure on the reverse face 33 of the diamond plate 6. Reference numeral 9 denotes the electrodes, which in this first embodiment of the invention are the same as the metal coating 4 and consist of a continuous metal layer 12 on the upper face 32 of the diamond plate 6 and of a continuous metal layer 13 on the reverse face 33 of the diamond plate 6, the peripheral regions of the upper face 32 and reverse face 33 being kept free of a metal coating.

While the electrode 9 on the upper face 32 of the diamond plate 6 is connected by way of a bonding connection 15 to a contact connection surface 22 on the substrate 5, the electrode 9 on the reverse face 33 of the diamond plate 6 is connected by way of a metal strip bridge 54 to a metal layer 17 on the substrate 5. Reference numeral 11 denotes a ceramic plate, which is used as the substrate 5 in this embodiment.

In this embodiment of the invention, the ceramic plate 11 is held, by means of a metallic holding frame 34 of aluminium, on a metallic carrier frame 23, which in practical terms forms the housing of the detector. Electrically conductive elastomeric buffer elements 48 and 49 are arranged between the carrier frame 23 and the ceramic plate 11 and also between the conductor frame 34 and the ceramic plate 11 and protect the ceramic plate 11 from mechanical stress, wherein at least the buffer 48 between the reverse face 40 of the ceramic plate 11 and the carrier plate 23 is held at ground potential because the carrier frame 23 is connected to the ground potential of the system (not illustrated). By way of the screw connection 35 and the holding frame 34 of metal, the ground potential is applied to the reverse face 40 of the ceramic plate 11 and is connected, by way of the metal strip bridge 54, to the metal layer 13 of the reverse face 33 of the diamond plate 6. The contact connection surface 22 on the substrate 5 can be a printed thin-film or thick-film surface, which is connected to additional passive components 26 (not shown).

While the metal structure 8 on the reverse face 33 of the diamond plate 6 is held at ground potential by way of a metal strip bridge 54, a voltage is applied to the electrode 9 of the upper face 32 of the diamond plate by way of the contact connection surface 22 and the bonding wire 15. That voltage is governed by the thickness of the diamond plate 6 and in this embodiment of the invention is about 1 V per µm of thickness. The thickness of the diamond plate 6 in this embodiment is about 200 µm so that a voltage of 200 V is applied to the metal structure 7 of the upper face 32 of the diamond plate 6 by way of the bonding wire 15. That voltage is supplied by way of a coaxial cable 41 whose sheath 42 is held at ground potential.

When the particle beam passes through the diamond plate 6 in the direction of the arrow 2, electron hole-pairs are generated, which are separated by virtue of the high field strength and give rise to a current which is proportional to the intensity of the ion beam. For position-resolving detection of the ion beam, that is to say for detection of the profile of the ion beam over its cross-section, the metal structure 7 on the upper face 32 of the diamond plate 6 can be structured into many individual electrodes so that correspondingly many bonding wires 15 direct away the measurement signals to corresponding evaluation circuits. For that purpose the contact connection surfaces 22 on the ceramic plate 11 are correspondingly multiplied and are in communication with corresponding external connections (not shown) of the detector 100, which are insulated from the ground potential and which lead to the outside.

In a further embodiment of the invention, the metal structures on the upper face and/or reverse face of the diamond plate 6, which are denoted by the reference numerals 7 and 8, are not metal layers but, rather, metal strips in the form of a grid, which, on the upper face 32 of the diamond plate 6, run in parallel in a direction relative to which the direction of the metal strips on the reverse face 33 of the diamond plate 6 is arranged at a right angle. In that case, the number of conductor tracks on the ceramic plate 11 corresponds to the number of metal strips of the metal structure 8 on the reverse face of the diamond plate 6.

By means of the structure in strip or grid form of the metal coating 4 on the upper face 32 and reverse face 33 of the diamond plate 6 it is possible to achieve maximum position resolution, although for evaluation and control of the crossing points of the two strip or grid arrangements a complex control and evaluation circuit is necessary. By means of a detector of such a kind, high-intensity beams of particles, that is to say particle beams or ion beams or electron beams, can be detected with a temporal resolution of nano-seconds and with a position resolution in the micrometre range. Using an appropriate amplification aid, individual particles can also be detected so that, using this detector, an intensity range of more than 10 orders of magnitude from 1 up to about $10^{13}$ particles per pulse packet and per $mm^2$ can be detected. In the process, high-intensity pulse packets in the order of magnitude from $10^5$ particles per pulse packet and per $mm^2$ up to $10^{13}$ particles per pulse packet and per $mm^2$ will not be expected to cause any damage to the detector. Even in a preferred range between $10^7$ particles per pulse packet and per $mm^2$ and $10^{13}$ particles per pulse packet and per $mm^2$, the detector signal can be proportional to the intensity of the particle beam.

In this embodiment of the invention, the diamond plate 6 is deposited in polycrystalline form from the gas phase. The central orifice 24 in the ceramic plate 11 is dimensioned according to the size of the diamond plate 6, which can be several $cm^2$ in size. For measuring a scanning ion beam, that central orifice 24 is tetragonal, as is the diamond plate 6. For a circular ion beam, the diamond plate 6 and the central orifices 24 can be of circular construction.

Figure 2:
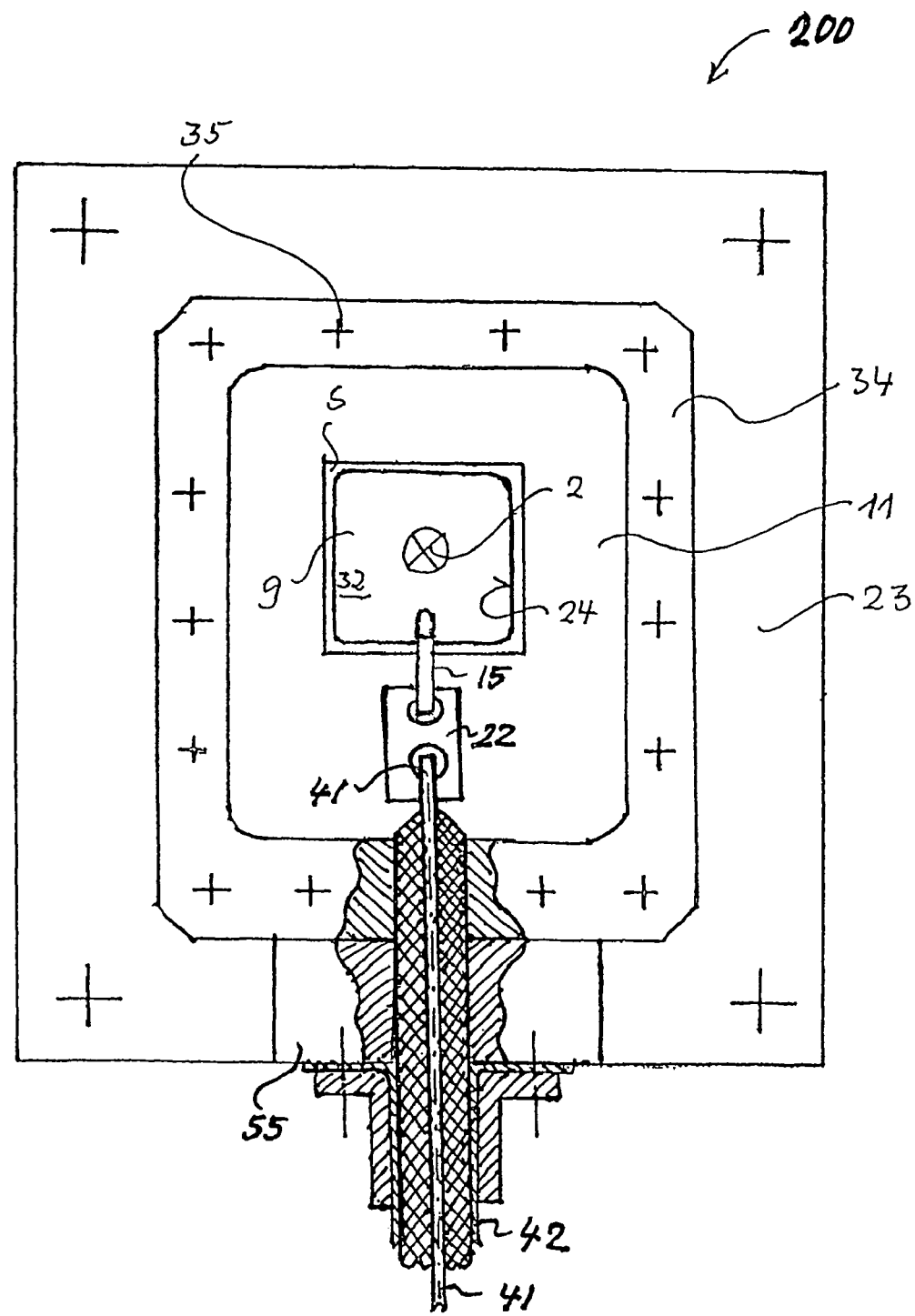
FIG. 2 is a top view, in diagrammatic form, onto a detector according to a further embodiment of the invention.

FIG. 2 is a top view, in diagrammatic form, onto a detector 200 according to a further embodiment of the invention. Components having the same functions as in FIG. 1 are referred to by the same reference numerals and are not separately discussed.

In the centre of the detector 200 there is a central orifice 24, which is covered by the diamond plate 6, through which the particle beam 2 passes. The upper face 32 of the diamond plate 6 is metallised and is connected, by way of a bonding connection 15 and a contact connection surface 22, to a coaxial cable 41, by means of which a measurement voltage is supplied and the detector signal taken away. The coaxial sheath 42 of the coaxial cable 41 is fixed to a mounting 55 on the carrier frame 23 and is held at ground potential.

The reverse face 33 of the diamond plate 6 is connected, by way of a metal strip bridge (not shown here) on the ceramic plate 11, to the reverse face 17 of the ceramic plate 11. The holding frame 34 is firmly screwed by means of screw connections 35 to the carrier frame 23 so that the reverse face of the ceramic plate is electrically connected to the housing and accordingly the reverse face of the diamond plate can be held at a ground potential. The passage of an ion beam through the diamond plate 6 gives rise to a current between the coaxial cable 41 and the coaxial sheath 42, which is in this instance connected to the carrier plate 23 of metal, which current corresponds to the intensity of the particle beam 2 and is proportional to the intensity of the particle beam over more than 10 orders of magnitude.

Figure 3:
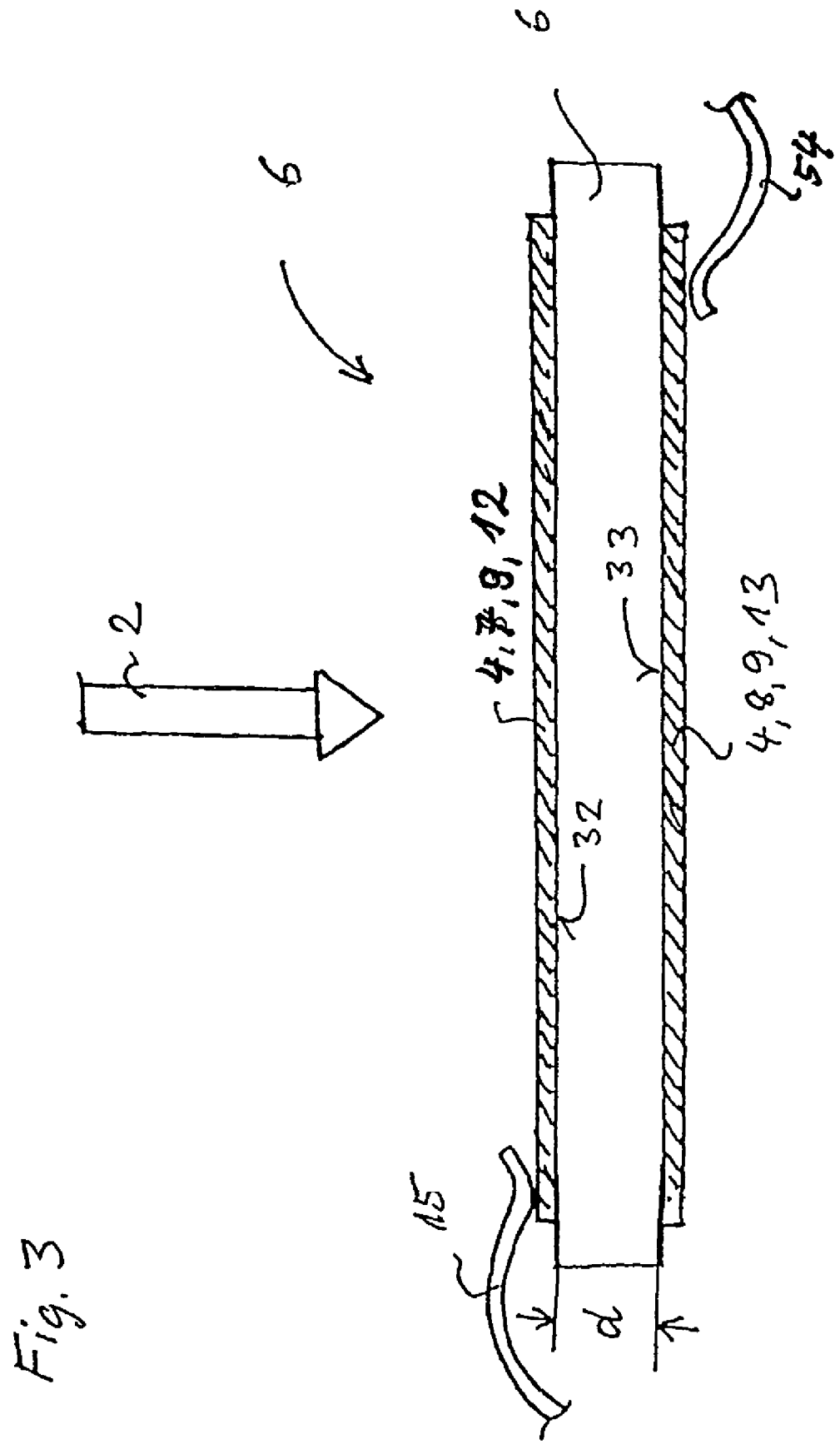
FIG. 3 is a cross-section, in diagrammatic form, through a diamond plate of a detector.

FIG. 3 is a cross-section, in diagrammatic form, through a diamond plate 6 of a detector 100. Components having the same functions as in the preceding Figures are referred to by the same reference numerals and are not separately discussed.

The diamond plate 6 has a thickness d, which also governs the difference in potential between the continuous metal layer 8 on the reverse face 33 and the continuous metal layer 7 on the upper face 32 of the diamond plate 6. While the metal layer 13 on the reverse face 33 of the diamond plate 6 rests on a ceramic plate (not shown) and is connected, by way of a metal strip bridge 54, to a metal coating (not shown) on the reverse face of the ceramic plate, the metal layer 12 on the upper face of the diamond plate 6 is connected by means of a bonding wire 15 to a contact connection surface on the upper face of the ceramic substrate.

The embodiment shown in FIG. 3 is a relatively simple embodiment of the diamond plate 6 for determining the beam intensity. However, in order to measure the ion beam in positionally dependent manner, at least one of the metal coatings 4 is structured and is sub-divided into individual contact surfaces which are microscopically small and which consequently can be measured only under a light microscope. For position-resolving measurement, each of those contact surfaces on the upper face 32 of the diamond plate 6 is then connected to corresponding external connections (not shown) of the detector.

Figure 4:
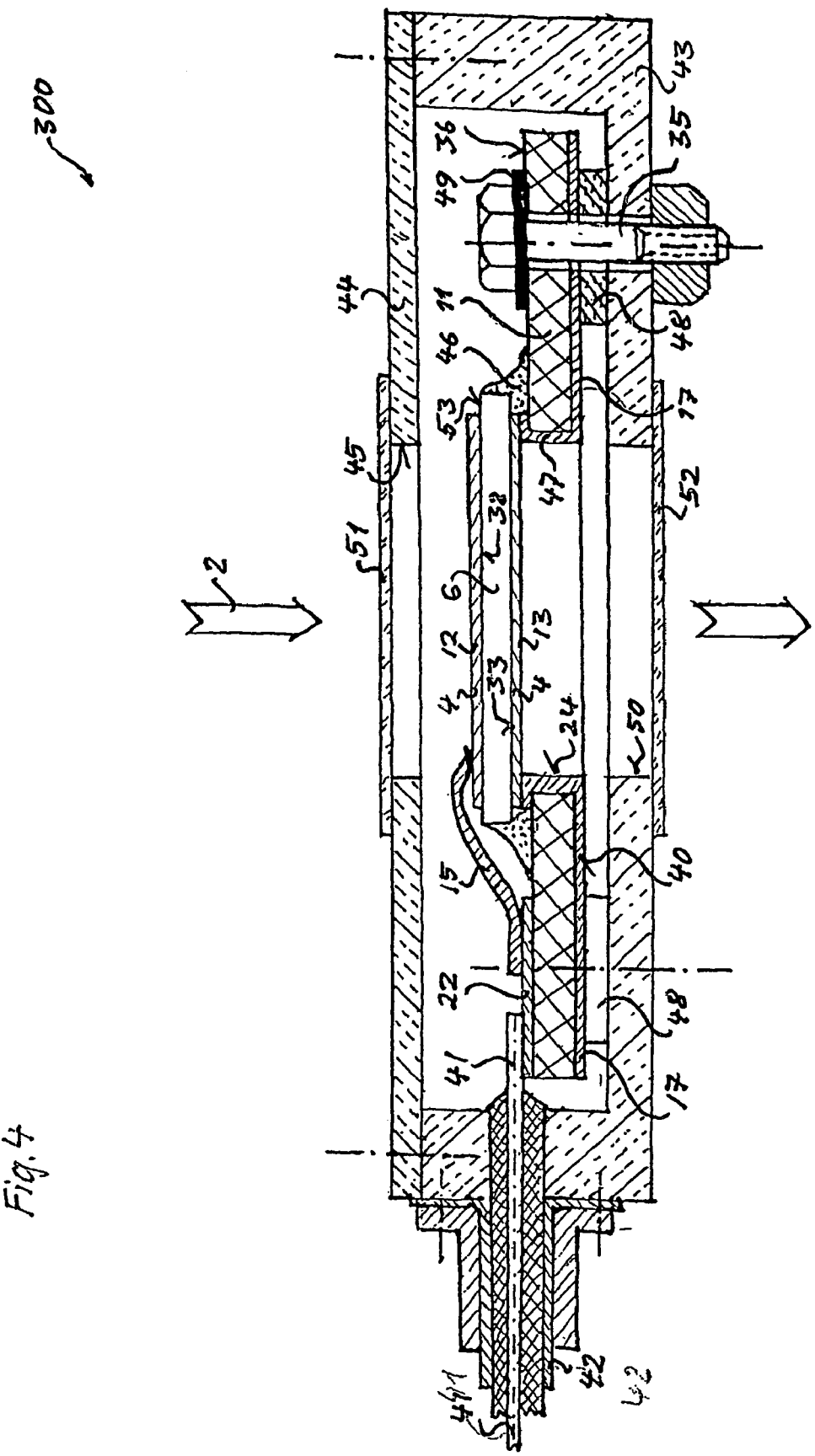
FIG. 4 is a cross-section, in diagrammatic form, through a detector according to a third embodiment of the invention.

FIG. 4 shows a detector 300 of a third embodiment of the invention. Components having the same functions as in the preceding Figures are referred to by the same reference numerals and are not separately discussed.

In FIG. 4, the carrier frame shown in FIG. 1 is extended to form a metallic detector housing 43, which is closed off by a metallic housing cover 44. The metallic housing cover 44 has an orifice 45, which corresponds in shape and size to the diamond plate 6 and has at least the dimensions of the central orifice 24 of the ceramic plate 11 and is aligned with that central orifice 24. The detector housing 43 has an orifice 50 in the base of the housing. That orifice 50 also has at least the dimensions of the central orifice 24 of the ceramic plate 11 and is aligned therewith. The housing cover orifice 45 and the housing base orifice 50 are sealed with metallised Kapton films 51 and 52, respectively. Consequently, and as a result of the substantially enclosed detector housing of metal, which is held at ground potential, the diamond plate 6 is protected, as in a Faraday cage, from stray electrical radiation.

In its non-metallised peripheral region 53, the diamond plate 6 is bonded to the upper face 36 of the ceramic plate 11 using an insulating adhesive 46. In another advantageous embodiment of the invention, the ceramic plate 11 is coated with metal on its reverse face 40, the walls of the central orifice 24 also having a metal coating 47. The metal coating 47 is in contact with the metal coating 13 on the reverse face 33 of the diamond plate 6 and with the metal coating 17 of the reverse face 40 of the ceramic plate 11.

An electrically conductive elastomeric buffer 48 is arranged between the detector housing 43 and the metal coating 17 of the reverse face 40 of the ceramic plate 11. On the one hand, that buffer 48 causes the detector housing 43 and the reverse face 40 of the ceramic plate 11 to be connected in electrically conductive manner and, on the other hand, the buffer 48 of conductive rubber provides protection for the ceramic plate against stresses, especially tensile loads.

A further electrically conductive elastomeric buffer washer 49 can be arranged between a fastening screw 49 and the upper face 36 of the ceramic plate 11. A coaxial cable 41 for measurement voltage supply and measurement signal delivery is passed in insulated manner through the detector housing 43, the coaxial sheath 42 of which cable is held at the ground potential of the detector housing 43.

Figure 5:
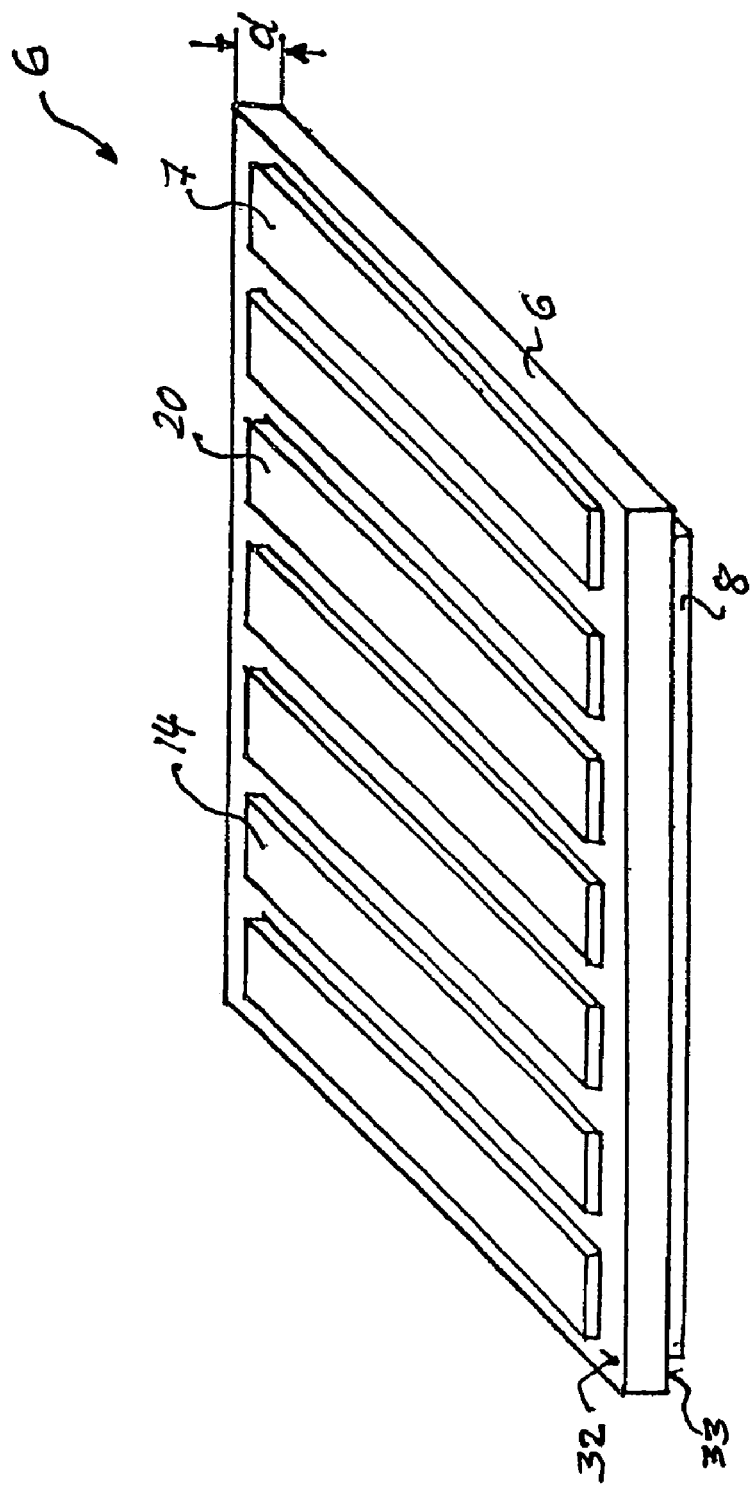
FIG. 5 is a view of a further diamond plate of a detector.

FIG. 5 is a perspective view of a further diamond plate 6 of a detector. While in FIGS. 1 to 4 the diamond plate 6 is shown preferably having upper and reverse faces 32 and 33 continuously metallised on both faces, the metal coating 7 of the upper face 32 in the embodiment according to FIG. 5 is structured into metal strips 20 having a pitch of 25 μm, while the metal layer 8 of the lower face 33 forms a large-area electrode. Such structuring allows one-dimensional position determination of the width of a particle beam. Two diamond plates 6 of such a kind stacked one on top of the other allow two-dimensional position determination of the positional intensity distribution of a particle beam.

Figure 6:
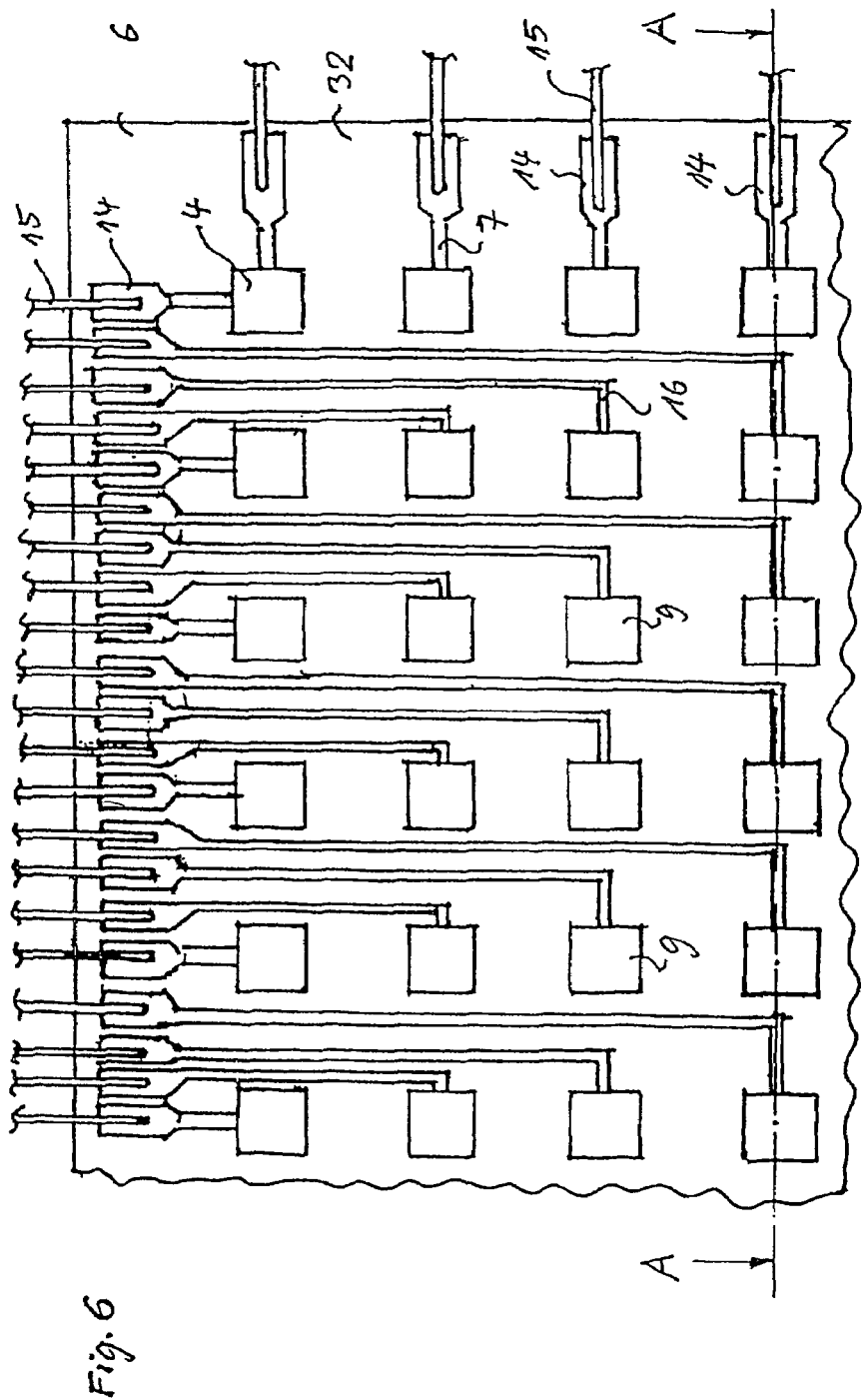
FIG. 6 is a top view, in diagrammatic form, onto a region of a metal structure of the upper face of a diamond plate.

FIG. 6 is a top view, in diagrammatic form, onto a region of a metal structure 7 of the upper face 32 of a diamond plate 6. Components having the same functions as in the preceding Figures are referred to by the same reference numerals and are not separately discussed.

The metal structure 7 is so structured that two-dimensional position-resolving measurement of a particle beam or ion beam is possible. For that purpose, microscopically small electrodes 9 having a surface area of 180×180 μm² are arranged evenly distributed at uniform grid dimensions on the surface 32 of the diamond plate 6; conductor tracks 16 having a width of 0.5 μm are arranged therebetween at spacings of 0.5 μm so that for 20 conductor tracks arranged beside one another a non-sensitive strip of 20 μm is required between the sensitive electrodes having a width of 180 μm in order to connect the 160 sensitive electrodes to contact surfaces 14 in the peripheral region of the diamond plate 6. From those 160 contact surfaces 14, individual bonding wires 15 lead to corresponding contact connection surfaces on a substrate located therebelow (not shown) in the form of a ceramic plate. Each of those electrodes is supplied, by way of the bonding wires 15 and the conductor tracks 16, with a measurement voltage so that, at each of those electrodes 9, the positional intensity of an ion beam or particle beam can be measured in two-dimensional manner.

Figure 7:
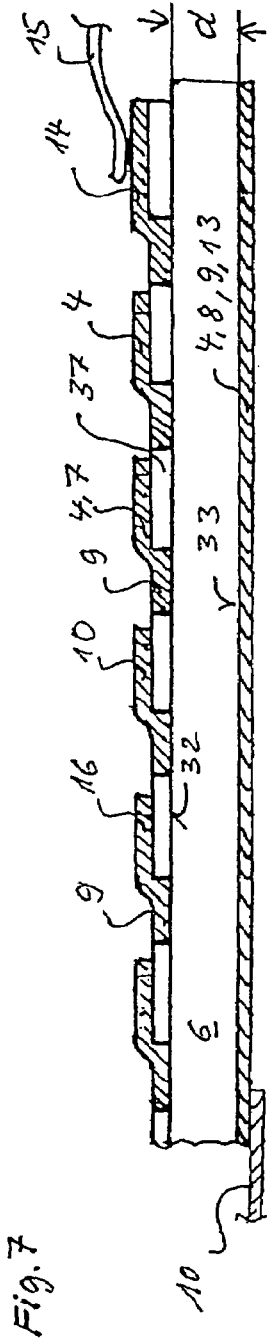
FIG. 7 is a cross-section, in diagrammatic form, through part of a diamond plate along the line of section A-A of FIG. 6.

FIG. 7 is a cross-section, in diagrammatic form, through part of a diamond plate 6 along the line of section A-A of FIG. 6. Components having the same functions as in the preceding Figures are referred to by the same reference numerals and are not separately discussed.

The cross-section through a diamond plate 6 shows that the reverse face 33 of the diamond plate 6 is covered by a continuous metal layer of sub-microscopic thickness as the frame electrode. The ground potential can be applied, by way of a conductor track 10 on the substrate (not shown), to the reverse face 33 of the diamond plate 6. In order not to falsify the position-resolving measurement result at the electrodes 9 having an area of 180×180 μm², the conductor tracks 16 having a width of 0.5 μm and the contact connection surfaces 14, which are shown in FIG. 4, are arranged on an insulation layer 37, which electrically insulates and passivates the surface of the diamond plate 6.

The insulation layer 37 can be made from sapphire, silicon nitride, silicon carbide, boron nitride or silicon dioxide. The crucial aspect is that, even in the case of high-intensity and/or high-energy particle beams, that insulation layer remains radiation-resistant and does not become electrically conductive.

FIG. 8 is a top view, in diagrammatic form, onto a region of a metal structure 7 of the upper face 32 of a diamond plate 6. Components having the same functions as in the preceding Figures are referred to by the same reference numerals and are not separately discussed.

Reference numeral 19 denotes a grid network of metal strips 20 on the upper face 32 of the diamond plate 6. The metal strips arranged on the upper face 32 are shown by means of continuous lines, while the metal strips on the reverse face of the diamond plate 6 are indicated by broken lines. That strip structure has the advantage that each strip can be contacted in the peripheral region by a bonding wire 15 in the form of a flat conductor, without having to provide conductor tracks as in FIG. 6 on the upper face 32 of the diamond plate 6.

A further advantage of this embodiment of the invention over the embodiment according to FIG. 6 is that no insulation layers have to be provided and the position-resolving result cannot be falsified by conductor tracks or contact connection surfaces. This is achieved as a result of the fact that the lower face of the diamond plate does not have a continuous metal surface in the form of a metal mirror but is likewise structured into metal strips. The control and measurement electronics for a detector of such a kind having a diamond plate is, however, more complex and costly than in the preceding embodiments, especially as each crossing point has to be addressed individually and in succession in order to ensure maximum position resolution. Even a strip structure of only 10 strips per square centimetre of area of the detector plate 6 results in 100 measurement points or 100 crossing points, which have to be addressed in succession. If the number of strips on the upper and lower faces are doubled, the measurement points are already quadrupled. Accordingly, even though a high density of measurement points can be achieved, the outlay for control and detection circuits will of course rise in quadratic relation along with the number of metal strips on the upper face 7 of the diamond plate 6.

FIG. 9 is a cross-section, in diagrammatic form, through part of a diamond plate 6 along the line of section B-B of FIG. 8. Components having the same functions as in the preceding Figures are referred to by the same reference numerals and are not separately discussed.

FIG. 9 shows that the upper strip structure 20 and the lower strip structure are located opposite one another, the metal strips 21 of the lower strip structure being directly connected electrically by way of conductor tracks 10 on a substrate (not shown). The upper strips 20, on the other hand, have to be first connected by way of bonding connections 15 to corresponding interwiring lines on the substrate. For the purpose of position-resolving measurement, a measurement voltage (signal pulse) is read out in each case at two strips 20 and 21, namely a strip 20 on the upper face 32 and a strip 21 on the lower face 33 in the event of a particle having passed through that point of the detector. That measurement voltage is taken from each affected crossing point in rapid succession, for example using a shift register, and is placed in a memory so that all measurement points on the diamond plate 6 can be detected in less than 1 μs. An arrangement of such a kind has a limit, however, in that the number of measurement points cannot be increased at will, especially if in the case of pulsed operation the particle beams, bundled or focussed with high intensity, pass through the diamond plate only for fractions of microseconds.

FIG. 10 to 15 are diagrammatic sketches of intermediate products that are formed during steps in the production of a diamond plate 6 of an embodiment of the invention. Components having the same functions as in the preceding Figures are referred to by the same reference numerals and are not separately discussed.

Figure 10:
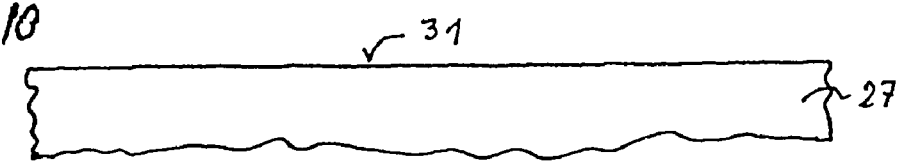
FIGS. 10 to 15 are diagrammatic sketches of intermediate products that are formed during steps in the production of a diamond plate of an embodiment of the invention.

FIG. 10 shows a substrate plate 27. A substrate plate 27 of such a kind can be made from a metal plate of a metal, such as molybdenum, which has a melting point of more than 1000° C. or can be a monocrystalline silicon wafer.

Figure 11:
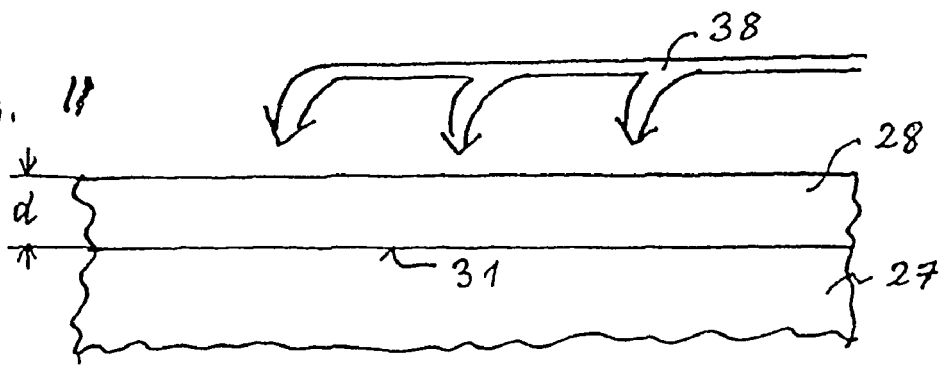

In FIG. 11, onto the upper face 31 of the substrate plate 27, which face has been lapped by mechanical etching means, carbon is deposited on the substrate plate 27 from a gas stream 38, which is a carrier gas of hydrogen with an added organocarbon substance, so that a polycrystalline diamond layer 28 is deposited in a thickness d on the upper face 31.

Figure 12:
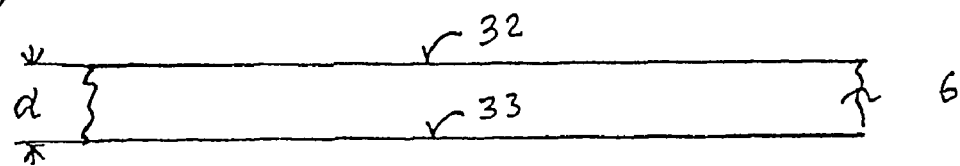

In this embodiment, the thickness d of 200 μm is in the range from 50 to 500 μm and is so stable that, as shown in FIG. 12, the substrate plate 27 can be etched away so that, at first, a crude diamond plate of polycrystalline material is present. That diamond plate can be polished on its upper face 32 and its lower face 33 by mechanical etching means, provided that an adequate thickness d of between 100 μm and 500 μm is present so that it can form a diamond plate 6 of uniform thickness d for a detector.

Figure 13:
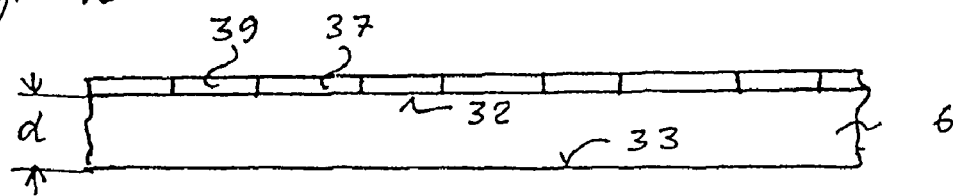
Figure 14:
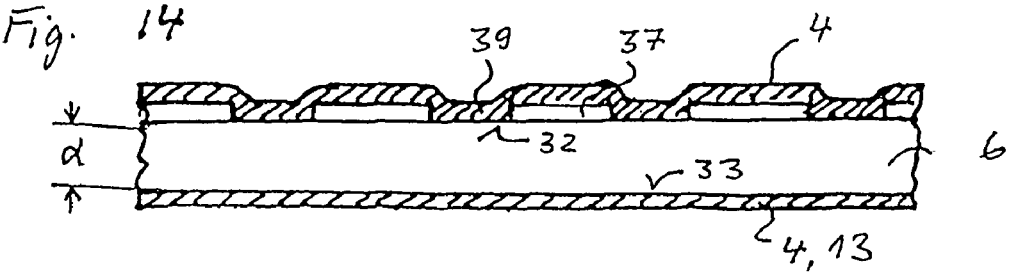

After the chemical gas phase deposition and the optional polishing of the upper face 32 and lower face 33, a structured insulation layer 37 is applied to the upper face 32, as shown in FIG. 13, in which layer windows 39 of, for example, 180×180 μm², remain open to the upper face 32 of the diamond plate 6 so that in the next method step, which is shown in FIG. 14, a continuous metal coating 4 can be applied both on top of the insulation layer 37 and also in the windows 39. At the same time or subsequently, the reverse face 33 can also be provided with a continuous metal layer.

Figure 15:
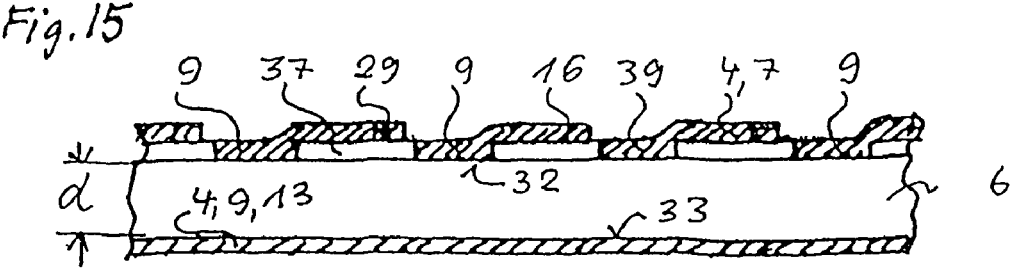

The continuous metal coating 4 on the upper face 32 is then structured as shown in FIG. 15 so that a conductor track structure 29 is formed on top of the insulation layer 37 while individual electrodes 9, which are insulated from one another, remain behind in the windows 39. The structure thereby produced corresponds to the structure as discussed hereinbefore with reference to FIGS. 6 and 7.

Figure 16:
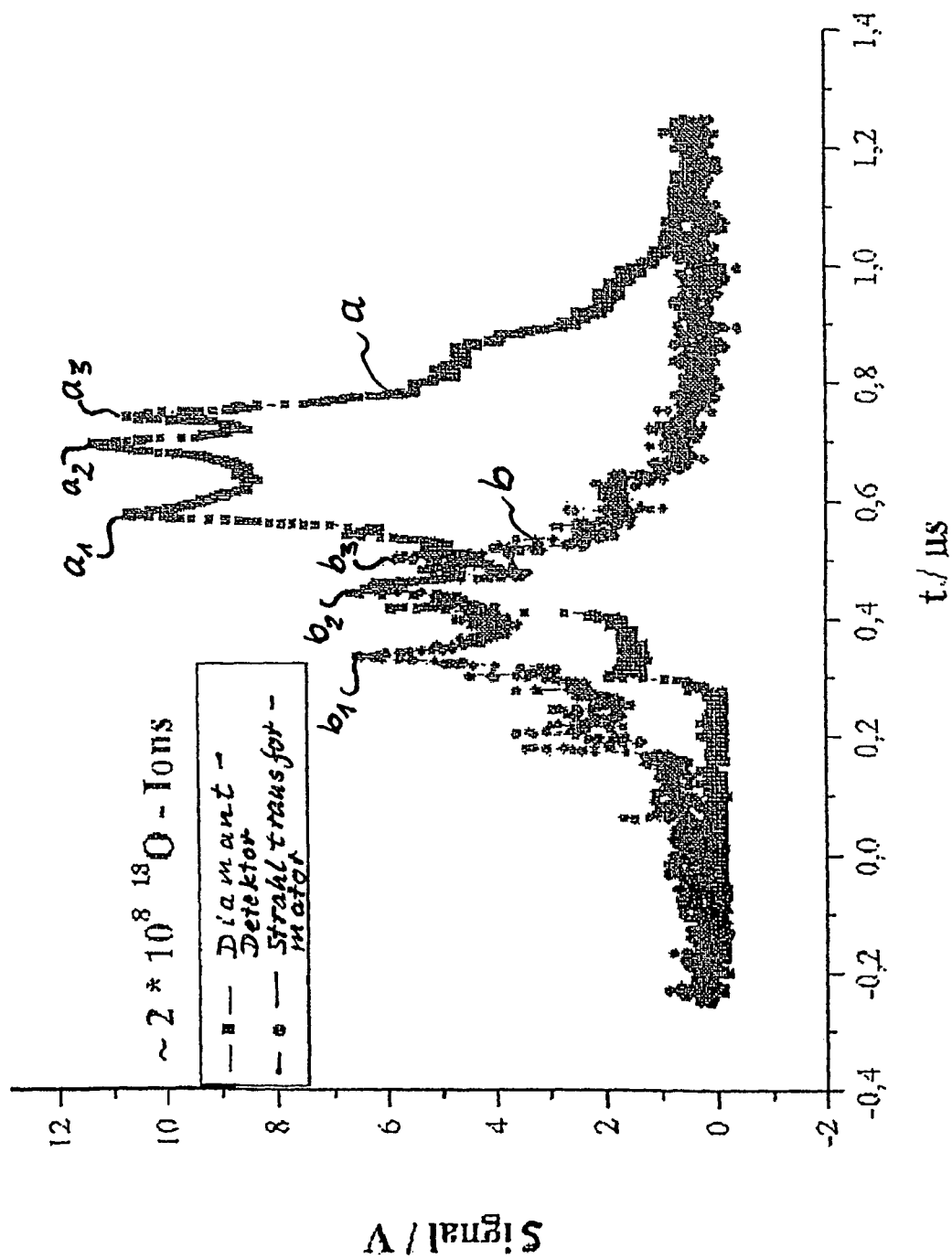
FIG. 16 is a diagram comparing the measurement signals of a conventional inductive beam monitor comprising a beam transformer and of the detector according to the invention, the measurement signals being triggered by a high-intensity pulse packet.

FIG. 16 shows a comparison of the measurement signals of a conventional inductive beam monitor and of the detector according to the invention. Hitherto, beam intensities of more than $10^5$ particles per pulse packet have been measured using inductive beam monitors by means of a beam transformer, because conventional diamond plates having conventional metallisation fail at such high intensities. For comparison of the measurement signals, the beam intensity was raised successively up to $10^{10}$ particles per pulse packet.

The particle beam measured for the comparison illustrated in FIG. 16 was a sixfold-charged oxygen beam ($^{16}O$, 6+) having a kinetic energy of 300 MeV/amu and an intensity of $2 \times 10^8$ ions per pulse packet. In the process, curve a was recorded using a diamond detector according to the invention and curve b was determined using a conventional beam monitor. For the comparison shown in FIG. 16, however, the measurement signal of the conventional beam monitor had to be multiplied by a factor of 1000 in order to be able to compare, in the common illustration of FIG. 16, the measurement signals of the beam monitor with the 2000-times larger signals of the diamond detector according to the invention in a meaningful manner. It is clear from the illustration that curves a and b show the same temporal intensity distribution, each having three peak values $a_1$, $a_2$, $a_3$ and $b_1$, $b_2$, $b_3$, respectively, but temporally offset from another because the beam monitor is arranged upstream of the diamond detector in this measurement comparison. For the comparison, the measurement signals of the diamond detector were neither amplified nor multiplied by a factor, in contrast to the substantially weaker measurement signals of the conventional inductively coupled beam monitor.

LIST OF REFERENCE SYMBOLS

100, detector
220, detector
300, detector
2 beam of particles or particle beam
3 semi-conductor plate
4 metal coating
5 substrate
6 diamond plate
7 metal structure on the upper face of the diamond plate
8 metal structure on the lower face of the diamond plate
9 electrodes
10 conductor track on the substrate
11 ceramic plate
12 metal layer of the upper face
13 metal layer of the lower face
14 contact surface of the diamond plate
15 bonding wires
16 conductor track on diamond plate
17 metal layer on the lower face of the ceramic plate
19 grid network
20 metal strips on the upper face
21 metal strips on the lower face of the diamond plate
22 contact connection surfaces on the ceramic plate
23 carrier frame
24 central orifice of the ceramic plate
27 substrate plate for the deposition of diamond
28 diamond layer
29 conductor track structure
31 surface of the substrate plate
32 upper face of the diamond plate
33 reverse face of the diamond plate
34 holding frame
35 screw connection
36 upper face of the ceramic plate
37 insulation layer on the diamond plate
38 gas stream
39 window
40 reverse face of the ceramic plate
41 coaxial cable
42 sheath of the coaxial cable
43 detector housing
44 housing cover
45 housing cover orifice
46 insulating adhesive
47 metal coating of walls
48 elastomeric conductive buffer
49 elastomeric conductive buffer washer 50 orifice in housing base
51 Kapton film on housing cover orifice
52 Kapton film on housing base orifice
53 peripheral regions of the diamond plate
54 metal strip bridge
55 mounting
a measurement curve measured using detector
b measurement curve measured using beam transformer
$a_1, a_2, a_3$ peak values measured using detector
$b_1, b_2, b_3$ peak values measured using beam transformer
d thickness of diamond plate
A-A line of section in FIG. 6
B-B line of section in FIG. 8

REFERENCES

1. Multiwire counters:
   a) Roger Fourme, "Position-sensitive gas detectors: MWPCs and their gifted descendants", Nuclear Instruments Methods A 392 (1997) 1-11
2. Diamond counters:
   a) E. Berdermann et al., "The use of CVD-diamond for heavy-ion detection", Diamond and Related Materials 10 (2001) 1770-1777
   b) W. Adam et al., "Performance of irradiated CVD diamond micro-strip sensors", Nuclear Instruments Methods A 476 (2002) 706-712
3. Berdermann et al., "Diamond Detectors 2001—Application for Minimum Ionizing Particles", GSI Annual Report 2001, p. 214
4. P. Strehl "Ion beam diagnosis", in B. Wolf (Ed.) Handbook of Ion Sources, CRC Press (1995) p. 385

The invention claimed is:

1. Detector for detecting a high-intensity and high-energy particle beam (2), which comprises a crystalline semi-conductor plate (3) having a metal coating (4) and which is arranged on a substrate (5), wherein
the semi-conductor plate (3) is a diamond plate (6), which is coated on both faces with metal structures (7, 8), the metal structures (7, 8) comprising aluminium and/or an aluminium alloy and the metal structures (7, 8) comprising electrodes (9), which are arranged to be connected to various electrical potentials by way of conductor tracks (10) on the substrate (5), and the substrate (5) comprising a ceramic plate (11) having a central orifice (24), which is covered by the diamond plate (6).

2. Detector according to claim 1, wherein
the metal structures on the upper face (7) and lower face (8) of the diamond plate (6) form two unstructured continuous metal layers (12, 13), the metal layer (13) of the lower face (33) having a ground potential and the metal layer (12) of the upper face (32) being provided with a potential at which the diamond plate (6) has a field strength in the range from 0.5 to 5 Volts per micrometre.

3. Detector according to claim 2, wherein
the metal structures (7, 8) on the upper face (32) and on the lower face (33) of the diamond plate (6) have a non-metallised peripheral region (53).

4. Detector according to claim 1, wherein
the diamond plate (6) has, on its upper face (32) and its reverse face (33), non-metallised peripheral regions having a width that corresponds to at least the thickness of the diamond plate (6).

5. Detector according to claim 1, wherein
the metal structure (8) on the lower face (33) of the diamond plate (6) has a continuous metal layer (13) and the metal structure (7) on the upper face (32) of the diamond plate (6) has a multiplicity of microscopically small contact surfaces (14) or metal strips (20), which are connected by way of bonding wires (15) and/or conductor tracks (16) on the ceramic plate (11) to external connections of the detector (100, 200, 300).

6. Detector according to claim 1, wherein
the metal structures (7, 8) comprise a grid network (19) of metal strips (20, 21), the metal strips (21) of the lower face (33) of the diamond plate (6) being arranged at a right angle to the metal strips (20) of the upper face (32) of the diamond plate (6).

7. Detector according to claim 1, wherein
the ceramic plate (11) has contact connection surfaces (22), which are connected to external connections of the detector (100, 200, 300) by way of a coaxial cable (41).

8. Detector according to claim 1, wherein
the detector (100) has a carrier frame (23), on which its detector components are fixed.

9. Detector according to claim 1, wherein
the detector (100, 200, 300) is arranged in a detector housing (43), which is provided with ground potential, and a metallised reverse face of the ceramic plate (11) being electrically connected, by way of an elastomeric electrically conductive buffer (48) of conductive rubber, to the detector housing (43).

10. Detector according to claim 1, wherein
the orifice (24) in the ceramic plate (11) is circular or virtually tetragonal.

11. Detector according to claim 1, wherein
the diamond plate (6) is a self-supporting polycrystalline diamond plate (6) formed by chemical gas phase deposition and having a thickness (d) in the range from 10 µm to 1000 µm, preferably from 100 µm to 200 µm.

12. Detector according to claim 1, wherein
the diamond plate (6) is a self-supporting monocrystalline diamond plate (6) having a thickness (d) in the range from 10 µm to 1000 µm, preferably from 100 µm to 200 µm.

13. Detector according to claim 1, wherein
the ceramic plate (11) has printed thin-film or thick-film conductors as interwiring lines or conductor tracks (10) and passive components in thin-film or thick-film technology.

14. Beam apparatus for high-intensity particle beams having $10^5$ to $10^{13}$ particles per pulse packet, preferably having $10^7$ to $10^{13}$ particles per pulse packet, the beam apparatus having a detector (100, 200, 300) according to claim 1.

15. Use of the detector according to claim 1 in the detection of high-intensity particle beams of a beam apparatus having beam intensities of $10^5$ to $10^{13}$ particles per pulse packet, preferably having beam intensities of $10^7$ to $10^{13}$ particles per pulse packet.

16. Method for the production of a detector (1) for detecting high-intensity and high-energy particle beams, which detector comprises a crystalline semi-conductor plate (3) having a metal coating (4) and which detector is arranged on a substrate (5), the method comprising the following method steps:
provision of a substrate plate (27),
chemical gas phase deposition, on the substrate plate (27), of a diamond layer (28) of carbon, removal of the substrate plate (27) from the diamond layer (28) to form a self-supporting diamond plate (6), coating of the upper face and reverse face of the diamond plate (6) with metal structures (7, 8), production of a ceramic plate (11) having a central orifice (24) and interwiring lines or conductor tracks having contact connection surfaces (22) and/or passive components, mounting of the diamond plate (6), metallised on both sides, on the ceramic plate (11), the central orifice (24) being covered, connection of the metal structures (7, 8) of the diamond plate (6) to the conductor tracks (10) or metal layers (17) on the ceramic plate (11), fixing the detector components on a carrier frame (23).

17. Method according to claim 16, wherein
for the chemical gas phase deposition of a diamond layer (28) of carbon on the substrate plate (27) a gaseous organocarbon substance is used.

18. Method according to claim 16, wherein
the gaseous substance comprises hydrogen together with 0.2 to 2% by vol. methane.

19. Method according to claim 16, wherein
for removal of the substrate plate (27) from the self-supporting diamond layer (28) a plasma etching method is used.

20. Method according to claim 16, wherein
for removal of the substrate plate (27) from the self-supporting diamond layer (28) a chemical wet etching method is used.

21. Method according to claim 16, wherein
for coating of the upper face (32) and reverse face (33) of the diamond plate (6) with a metal layer (12, 13) a sputtering, vapour-deposition or sintering method is used.

22. Method according to claim 16, wherein
for coating of the upper face (32) and/or reverse face (33) of the diamond plate (6) with a metal structure (7, 8) a sputtering or vapour-deposition method employing a mask is used.

23. Method according to claim 16, wherein
for coating of the upper face (32) and reverse face (33) of the diamond plate (6) with a metal structure (7, 8) a metal layer (12, 13) is first applied, which is subsequently structured by means of photolithography.

24. Method according to claim 16, wherein
for coating of the upper face (32) and reverse face (33) of the diamond plate (6) with a metallic strip pattern (20, 21) a metal layer (12, 13) is first applied and subsequently insulation channels or longitudinal grooves are introduced into the metal layer (12, 13) by photolithographic means.

25. Method according to claim 16, wherein
for provision of interwiring lines or conductor tracks (10), contact connection surfaces (22) and/or passive components on the ceramic plate (11) there are used thin-film or thick-film methods.

26. Method according to claim 15, wherein
for connection of the metal structures (7, 8) of the diamond plate (6) to interwiring lines or conductor tracks (10) on the ceramic plate (11) there is used a bonding method.

27. Method according to claim 16, wherein
for fixing of the detector components on a carrier frame (23) a metallic holding frame (34) is provided, which holding frame at the same time establishes a ground potential connection by way of a conductor track on the ceramic plate (11).

* * * * *